US007962159B2

(12) United States Patent
Beard et al.

(10) Patent No.: US 7,962,159 B2
(45) Date of Patent: Jun. 14, 2011

(54) METHOD AND SYSTEM FOR RECEIVING DATA ON A PORTABLE DEVICE

(75) Inventors: Joshua L. Beard, Washington, DC (US);
Louis C. Foss, Frederick, MD (US);
Nuno D. Pereira, Derwood, MD (US);
Robert S. Tabit, Gaithersburg, MD (US)

(73) Assignee: International Business Machines Corporation, Armonk, NY (US)

( * ) Notice: Subject to any disclaimer, the term of this patent is extended or adjusted under 35 U.S.C. 154(b) by 550 days.

(21) Appl. No.: 11/411,183

(22) Filed: Apr. 25, 2006

(65) Prior Publication Data
US 2007/0249373 A1 Oct. 25, 2007

(51) Int. Cl.
*H04W 4/00* (2009.01)

(52) U.S. Cl. .......... 455/466; 455/153; 455/152.1; 455/502; 455/519; 455/66.1; 455/414.1; 455/412.2; 455/427; 455/435.1; 370/468; 370/329; 370/437; 370/333; 370/469; 379/67.1

(58) Field of Classification Search .......... 370/468, 370/329, 437, 333, 253, 338, 316, 469; 455/153, 455/152.1, 502, 519, 504, 450, 518, 66.1, 455/466, 414.1, 412.2, 427, 435.1, 558; 709/220; 379/67.1; 340/7.1, 10.1, 572.1
See application file for complete search history.

(56) References Cited

U.S. PATENT DOCUMENTS

| | | | |
|---|---|---|---|
| 4,837,800 A | 6/1989 | Freeburg et al. | |
| 5,408,520 A | 4/1995 | Clark et al. | |
| 6,546,425 B1 | 4/2003 | Hanson et al. | |
| 6,714,793 B1* | 3/2004 | Carey et al. | 455/466 |
| 6,928,468 B2 | 8/2005 | Leermakers | |
| 6,954,642 B2* | 10/2005 | Chambers et al. | 455/435.1 |
| 6,976,217 B1 | 12/2005 | Vertaschitsch et al. | |
| 2002/0072379 A1 | 6/2002 | Chen et al. | |
| 2003/0005019 A1 | 1/2003 | Pabla et al. | |
| 2003/0018887 A1 | 1/2003 | Fishman et al. | |
| 2003/0229633 A1 | 12/2003 | Phillips | |
| 2004/0157586 A1* | 8/2004 | Robinson et al. | 455/412.1 |
| 2004/0171396 A1* | 9/2004 | Carey et al. | 455/466 |

(Continued)

OTHER PUBLICATIONS

La Porta, et al., "Challenges for Nomadic Computing: Mobility Management and Wireless Communications", *Mobile Networks and Applications 1*, (1996), pp. 3-16.

Agrawal, et al., "Mobile Computing in Next Generation Wireless Networks", *Copyright ACM*, 1999, pp. 32-39.

*Primary Examiner* — Marivelisse Santiago-Cordero
*Assistant Examiner* — Joseph Arevalo
(74) *Attorney, Agent, or Firm* — Scully, Scott, Murphy & Presser, P.C.; John Pivnichny

(57) ABSTRACT disclosed are a method of and a system for receiving data on a portable device. The method comprises the steps of providing a portable device having a data modem with active and dormant stages, and a short message service (SMS) capability; receiving a pre-defined SMS message and in response thereto, switching said data modem from said dormant stage to said active stage; and thereafter, receiving data through said data modem. The preferred embodiment of the invention uses a cellular PDA type device that can receive phone calls and Short Message Service (SMS) type messages even when the data modem of the PDA is not engaged. In this preferred embodiment, a special SMS message is sent from a back-end server infrastructure of a computer network to the PDA device to tell that device to "wake up" and connect to the network.

11 Claims, 2 Drawing Sheets

U.S. PATENT DOCUMENTS

| | | |
|---|---|---|
| 2004/0228332 A1 | 11/2004 | Seguin et al. |
| 2005/0203668 A1 | 9/2005 | Ciardella et al. |
| 2005/0206244 A1 | 9/2005 | Son |
| 2005/0207546 A1 | 9/2005 | Song et al. |
| 2005/0282585 A1* | 12/2005 | Heinonen et al. ............ 455/558 |
| 2006/0188074 A1* | 8/2006 | Wilson ..................... 379/67.1 |
| 2006/0255914 A1* | 11/2006 | Westman ................... 340/7.1 |
| 2007/0298836 A1* | 12/2007 | Yanover ................... 455/552.1 |
| 2008/0165716 A1* | 7/2008 | Choi et al. ................ 370/311 |

* cited by examiner

METHOD AND SYSTEM FOR RECEIVING DATA ON A PORTABLE DEVICE

BACKGROUND OF THE INVENTION

1. Field of the Invention

This invention generally relates to cellular PDA devices, and more specifically, to cellular PDA devices having both a data modem and a cellular phone capability.

2. Background Art

The PDA, or personal digital assistant, is a general-purpose computing machine sized and shaped generally to fit into the hand of a user or to be placed in a pocket, and allows a user to run various applications including personal information management applications such as address books and daily organizers. Many PDAs offer Internet connectivity capabilities and include a data modem that can be used to manage instantly many kinds of information, from e-mail, to medical data, to stock reports. Recently, PDAs have been developed that also have a cellular phone capability.

When using some Web or Web based technologies, these PDAs need to open the modem and leave a connection for the entire period of the data session. They need to maintain their connection for data functions such as enterprise messaging and push type application functionality where the back-end server sends data to the PDA device. This significantly drains the battery of these devices while they maintain their connection. Typically, these devices save battery life by causing the modem to enter a dormant stage when no data is being transmitted. This, however, prevents back-end servers from delivering data to the client device in common protocols that are used for such communication. There is a tradeoff between application functionality and battery life.

SUMMARY OF THE INVENTION

An object of this invention is to improve cellular PDA devices.

Another object of the present invention is to provide a method and system for establishing or re-establishing communications between a computer network and a cellular PDA device.

A further object of the invention is to provide a method and system for establishing or re-establishing TCP/IP communications from a mobile device by using a Short Message Service (SMS) type message directed at the device to tell it to wake up its data modem.

These and other objectives are attained with a method of and a system for receiving data on a portable device. The method comprises the steps of providing a portable device having a data modem with active and dormant stages, and a short message service (SMS) capability; receiving a predefined SMS message and in response thereto, switching said data modem from said dormant stage to said active stage; and thereafter, receiving data through said data modem.

The preferred embodiment of the invention, described below in detail, uses a cellular PDA type device that can receive phone calls and Short Message Service (SMS) type messages even when the data modem of the PDA is not engaged. In the implementation of this preferred embodiment, a special SMS message is sent from a back-end server infrastructure of a computer network to the PDA device to tell that device to "wake up" and connect to the network. When this occurs, the server infrastructure can deliver the intended data packets to the application program running on the handheld device before going dormant again. The invention may be embodied in a program storage device readable by machine, tangibly embodying a program of instructions executable by the machine to perform method steps for receiving data on a portable device having a modem with active and dormant stages, and a short message service capability.

Further benefits and advantages of the invention will become apparent from a consideration of the following detailed description, given with reference to the accompanying drawings, which specify and show preferred embodiments of the invention.

DETAILED DESCRIPTION OF THE PREFERRED EMBODIMENTS

Figure 1:
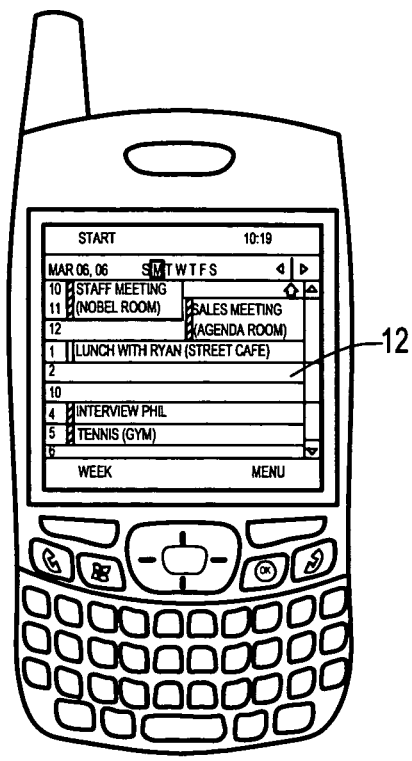
FIG. 1 illustrates a cellular PDA device embodying this invention.

FIG. 1 illustrates an example of a PDA device 10. This device is used to run various applications including personal information management applications such as address books, and daily organizers. As an example, a PDA device can hold 6000 addresses, five years of appointments, 1500 to-do items, 1500 memos, and 200 e-mail messages, and can run many different software applications. PDA device 10 offers Internet connectivity and also includes integrated cellular phone capability.

The front of PDA device 10 includes an LCD screen 12, which may be touch-sensitive to allow a user to enter and manipulate data. A stylus (not shown) may be provided to help touch screen inputs. By using the stylus, or another handheld pointer, to interact with a touch-sensitive screen, a PDA user can easily navigate through a host of built-in programs, software and other applications.

Figure 2:
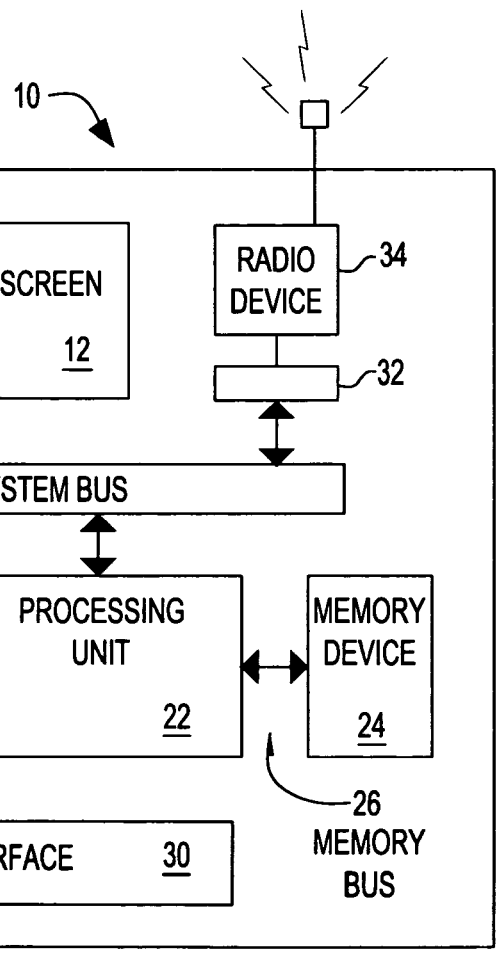
FIG. 2 is a block diagram showing selected components of the PDA device of FIG. 1.

FIG. 2 is a block diagram of selected components of PDA device 10. As illustrated in this Figure, device 10 includes a processing device 22, for executing applications and an operating system of the device 10, and a memory device 24 for storing the operating system, data, and the applications. A memory bus 26 is utilized to transfer programs and data from memory to the processing unit 22.

Display screen 12 is provided for display of Operating System prompts, buttons, icons, application screens, and other data, and for providing user inputs via tapping or touching (or drawing in area 12) via a stylus or other touch mechanism. Hardware interface 30 connects to physical hard buttons and switches located on a body of the device 10 and provide signals to applications running on the processing unit 22.

A modem 32 and a mobile radio device 34 provide connectivity to a cellular telephone network. The modem 22 is preferably a wireless or cellular modem that is adapted to establishing a two-way communications link, such as a full duplex cellular telephone connection, to a cellular telephone network.

A system bus 36 carries data and commands to/from the processing unit 22 from/to other devices within the device 10. For example, user applications running on the device 10 send application screens and other data outputs to display screen 12 for display via the system bus 36. User inputs are detected by the screen 12 and sent to the processing unit 22 via the system-bus 36.

A battery 40, typically a rechargeable battery, is used as a power supply for PDA 10 and the components thereof.

In the operation of PDA 10, phone calls directed toward the mobile radio device 34 are detected by the mobile radio device and sent, in the form of an incoming call notification, to the phone device (executing on the processing unit 22). The phone device processes the incoming call notification by notifying the user by, for example, an audio output such as ringing (not shown).

The phone device also includes a method for the user to answer the incoming call. For example, tapping on a phone icon, or pressing a hard button designated or preprogrammed for answering a call signals the phone device to send instructions (via system bus 36) to the mobile radio device 34 to answer the call.

A user places outgoing calls by entering digits of the number to be dialed and pressing a call icon, for example. The dialed digits are sent to the mobile radio device 34 along with instructions needed to configure the mobile radio device 34 for an outgoing call. The instructions may include, for example, 1. Access a base station, 2. Send digits, 3. Retrieve and forward ring indication (if any), 4. Connect call, 5. manage call, and 6. await further instructions. Many other instructions may be utilized.

Figure 3:
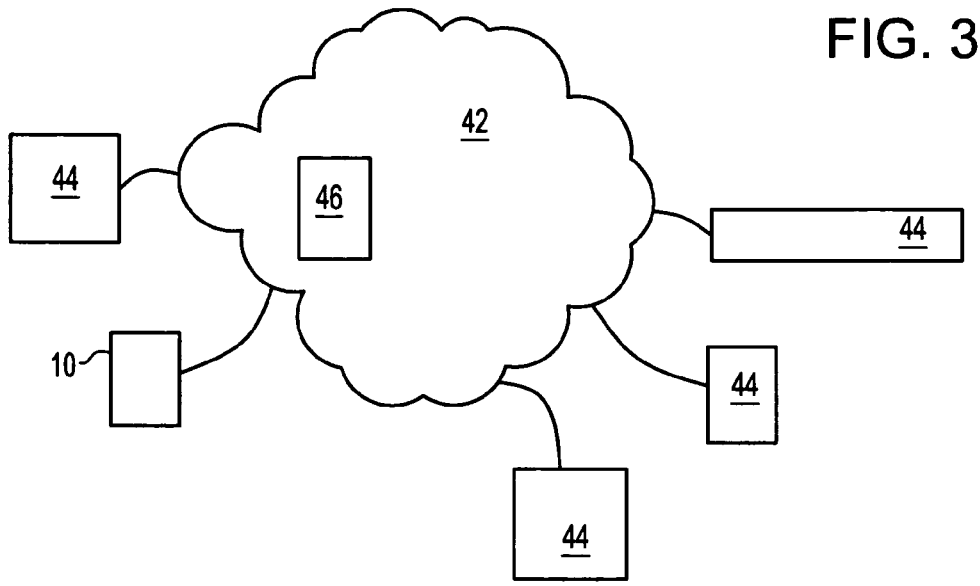
FIG. 3 shows the PDA device of FIG. 1 connected to the Internet.

PDA 10 offers Internet connectivity capabilities, and FIG. 3 illustrates device 10 connected to the Internet 42. As represented in FIG. 3, PDA device 10 is one of a multiplicity of clients 44 connected to the Internet, and specifically connected to server system 46.

As mentioned above, when using some Web or Web based technologies, PDAs, of the type described above, need to open the modem and leave a connection for the entire period of the data session. They need to maintain their connection for data functions such as enterprise messaging and push type application functionality where the back-end server sends data to the PDA device. This significantly drains the battery of these devices while they maintain their connection. Typically, these devices save battery life by causing the modem to enter a dormant stage when no data is being transmitted. This, however, prevents back-end servers from delivering data to the client device in common protocols that are used for such communication. There is a tradeoff between application functionality and battery life.

The present invention addresses this tradeoff by utilizing the fact that these cellular PDA type devices can receive phone calls and Short Message Service (SMS) type messages even when the data modem of the PDA is not engaged. In the implementation of this preferred embodiment, a special SMS message is sent from a back-end server infrastructure of a computer network to the PDA device to tell that device to "wake up" and connect to the network. When this occurs, the server infrastructure can deliver the intended data packets to the application program running on the handheld device before going dormant again.

More specifically, in accordance with the preferred embodiment of the invention, PDA 10 is provided with a program, called a listener, which intercepts all SMS messages sent to the PDA device. Any typical SMS message can be sent to the standard SMS phone application, but a suitably coded SMS message is defined that tells the local software to wake up and make a data connection. This local software could also launch a local application that could be used to interpret the data message being transferred. This saves battery life and makes the PDA applications more usable.

Figure 4:
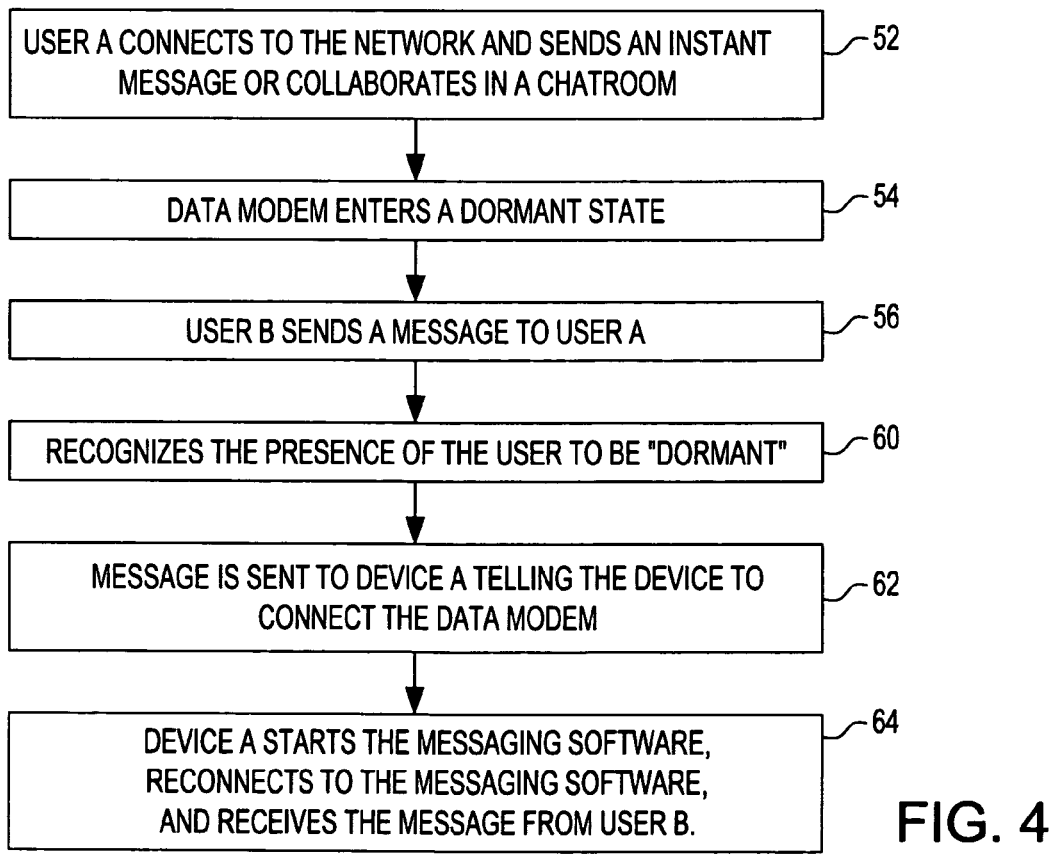
FIG. 4 is a flow chart showing an example of the method of the present invention.

A typical scenario for the functionality provided by the present invention is an instant messaging protocol, an example of which is shown in FIG. 4. At step 52, PDA User A connects to the network using his PDA device and sends an instant message or collaborates in a chat room. After approximately 5 minutes of inactivity, the Data modem on the PDA device, at step 54, enters a dormant state and the PDA device eventually goes to sleep to save battery life. At step 56, Laptop User B, who was working with PDA User A ten minutes earlier, decides to send a message to PDA User A. After sending the message, the instant messaging software, at step 60, recognizes the presence of the user to be "dormant" instead of active. This, at step 62, triggers a process in the instant messaging software to send an SMS message to the handheld device telling the device to connects its Data modem. When the handheld device reconnects, it, at step 64, starts the instant messaging software, reconnects to the instant messaging software and receives the message from Laptop User B and displays it to PDA User A. PDA User A then begins a collaborative session with Laptop User B.

It should be understood that aspects of the present invention can be realized in hardware, software, or a combination of hardware and software. Any kind of computer/server system(s)—or other apparatus adapted for carrying out the methods described herein—is suited. A typical combination of hardware and software could be a general-purpose computer system with a computer program that, when loaded and executed, carries out the respective methods described herein. Alternatively, a specific use computer, containing specialized hardware for carrying out one or more of the functional tasks of the invention, could be utilized.

Aspects of the present invention can also be embodied in a computer program product, which comprises all the respective features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

While it is apparent that the invention herein disclosed is well calculated to fulfill the objects stated above, it will be appreciated that numerous modifications and embodiments may be devised by those skilled in the art and it is intended that the appended claims cover all such modifications and embodiments as fall within the true spirit and scope of the present invention.

What is claimed is:

1. A method of receiving data on a portable communications device, comprising the steps of:

providing a portable communications device having a short message service (SMS) capability for receiving SMS messages over a first, cellular phone network, and a data modem for receiving data over a second, computer network, the data modem having active and dormant stages, and wherein the portable communications device is in the dormant stage;

a separate device sending an initial message to the portable communications device;

said separate device recognizing that the portable communications device is in the dormant stage;

said separate device, in response to recognizing that the portable communications device is in dormant stage, sending a pre-defined coded SMS wake-up message to the portable communications device to switch the data modem of the portable communications device from the dormant stage to active stage;

the portable communications device receiving the pre-defined coded SMS wake-up message over the first, cellular phone network from the separate device;

the portable communications device, in response to receiving said pre-defined coded SMS wake-up message, recognizing said pre-defined coded SMS message, and switching said data modem of the portable communications device from said dormant stage to said active stage; and after said switching, the portable communications device receiving data from said separate device, through said data modem and over the second, computer network.

2. A method according to claim 1, wherein the computer network includes a network server, and further including the step of, in response to receiving said pre-defined coded SMS wake-up message, connecting said data modem to said network server, and wherein the step of receiving data includes the step of receiving said data from said network server.

3. A method according to claim 2, wherein said recognizing step includes the steps of:
said portable device responding to said initial message in a defined way.

4. The method according to claim 1, wherein:
the computer networks includes a network server;
the portable communications device includes a listener for intercepting all SMS messages sent to the portable communications device; and
the pre-defined coded SMS wake-up message includes a code that instructs the portable communications device to switch said modem from the dormant stage to the active stage and to connect the data modem to the network server, and that launches an application on the portable communications device to interpret said data received from said separate device.

5. A portable communications system, comprising:
a portable communications device having a short message service (SMS) capability for receiving SMS messages over a first, cellular phone network, and a data modem for receiving data over a second, computer network, the data modem having active and dormant stages, and wherein the portable communications device is in the dormant stage, a separate device sends an initial message to the portable communications device, the separate device recognizes that the portable communications device is in the dormant stage, and the separate device, in response to recognizing that the portable communications device is in the dormant stage, sends a pre-defined coded SMS wake-up message to the portable communications device to switch the data modem of the portable communications device from the dormant stage to the active stage;

the portable communications device including:
a receiver for receiving the pre-defined coded SMS wake-up message over the first, cellular phone network from a separate device; and
means operating, in response to said receiver receiving said wake-up message, recognizing said pre-defined coded SMS wake-up message, and to switch said data modem of the portable communications device from said dormant stage to said active stage, and wherein after said switching, the portable communications device receives data from said separate device, through said data modem and over the second, computer network.

6. A portable communications system according to claim 5, wherein the computer network includes a network server, and wherein said operating means operates, in response to receiving said pre-defined coded SMS wake-up message, to connect said data modem to said network server, and to receive data from said network server.

7. A portable communications system according to claim 6, wherein:
said separate device includes recognizing means for recognizing that said portable device is in the dormant stage; and
said separate device sends said pre-defined coded SMS wake-up message in response to said recognizing means recognizing that said portable device is in said dormant stage.

8. A portable communications system according to claim 7, wherein:
said recognizing means includes means for sending the initial message to said portable device; and
said portable device responds to said initial message in a defined way.

9. A program storage device readable by machine, tangibly embodying a program of instructions executable by the machine to perform method steps for receiving data on a portable communications device having a short message service (SMS) capability for receiving SMS messages over a first, cellular phone network, and a data modem for receiving data over a second, computer network, the data modem having active and dormant stages, and wherein the portable communications device is in the dormant stage, said method steps comprising:
a separate device sending an initial message to the portable communications device;
said separate device recognizing that the portable communications device is in the dormant stage;
said separate device, in response to recognizing that the portable communications device is in the dormant stage, sending a pre-defined coded SMS wake-up message to the portable communications device to switch the data modem of the portable communications device from the dormant stage to the active stage;
the portable communications device receiving the pre-defined coded SMS wake-up message over the first, cellular phone network from the separate device;
the portable communications device, in response to receiving the pre-defined coded SMS wake-up message, recognizing said SMS message, and switching said data modem of the portable communications device from said dormant stage to said active stage; and
after said switching, the portable communications device receiving data from said separate device, through said data modem and over the second, computer network.

10. A program storage device according to claim 9, wherein the computer network includes a network server, and further including the step of, in response to said portable device receiving said pre-defined coded SMS wake-up message, connecting said data modem to said network server, and wherein the step of receiving data includes the step of receiving said data from said network server.

11. A program storage device according to claim 10, wherein said recognizing step includes the steps of:
said portable device responding to said initial message in a defined way.

* * * * *